J. E. NORQUEST.
SAFETY CUTTING MECHANISM.
APPLICATION FILED JULY 23, 1917.
1,252,932.
Patented Jan. 8, 1918.
3 SHEETS—SHEET 1.
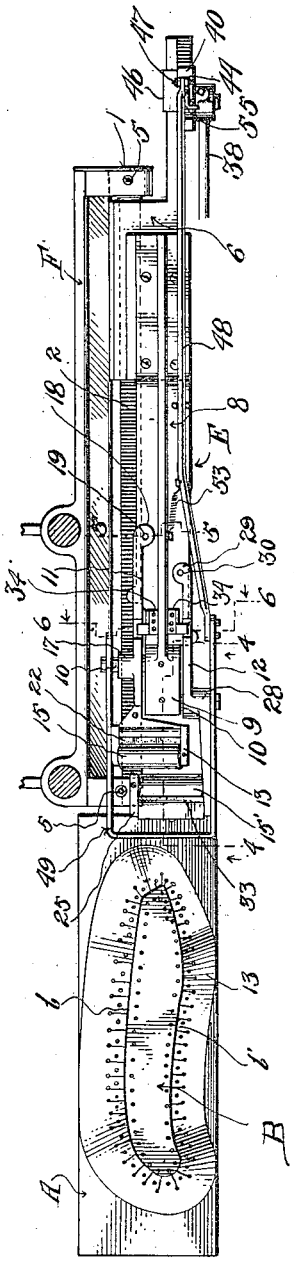
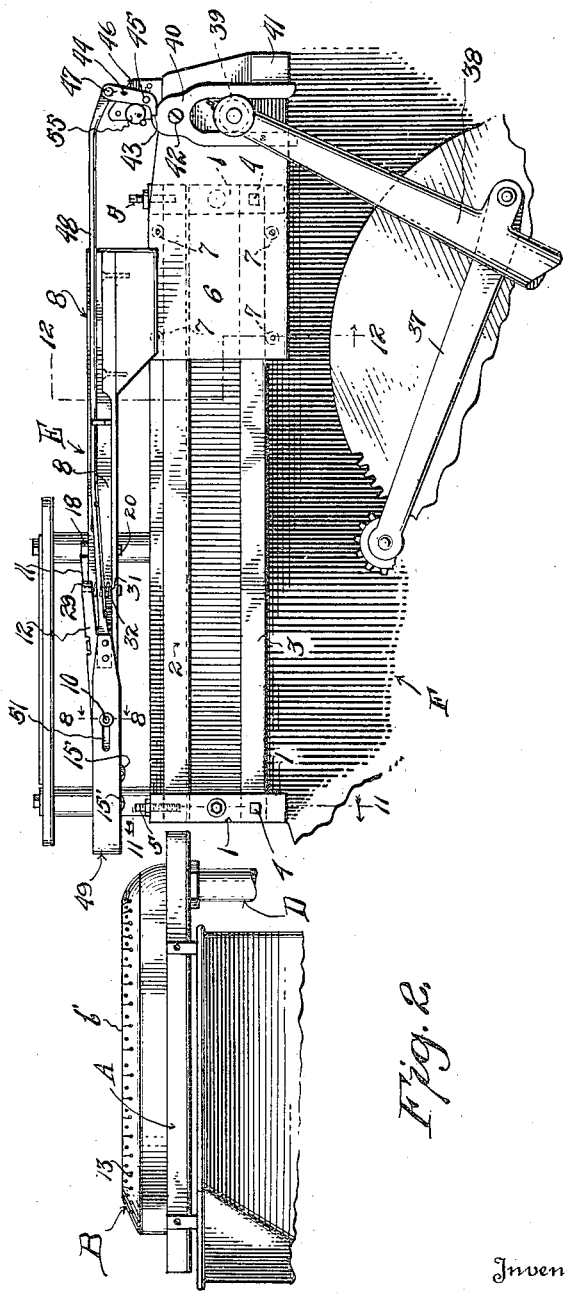
Inventor
John E. Norquest
Witness
By
Attorneys

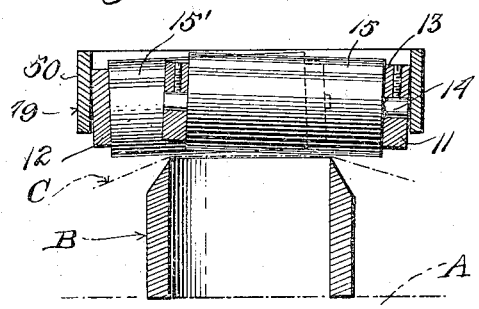
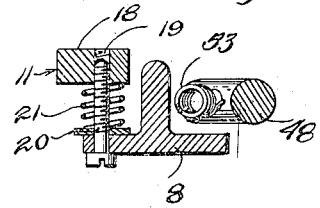
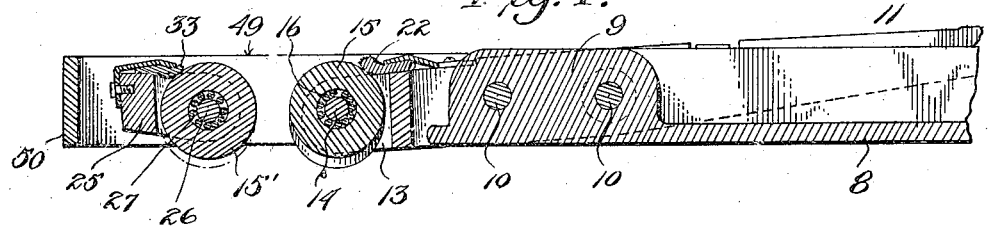
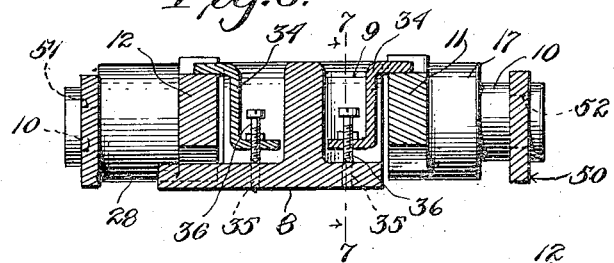
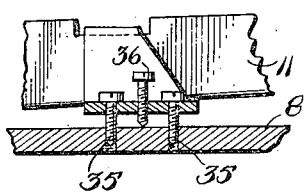

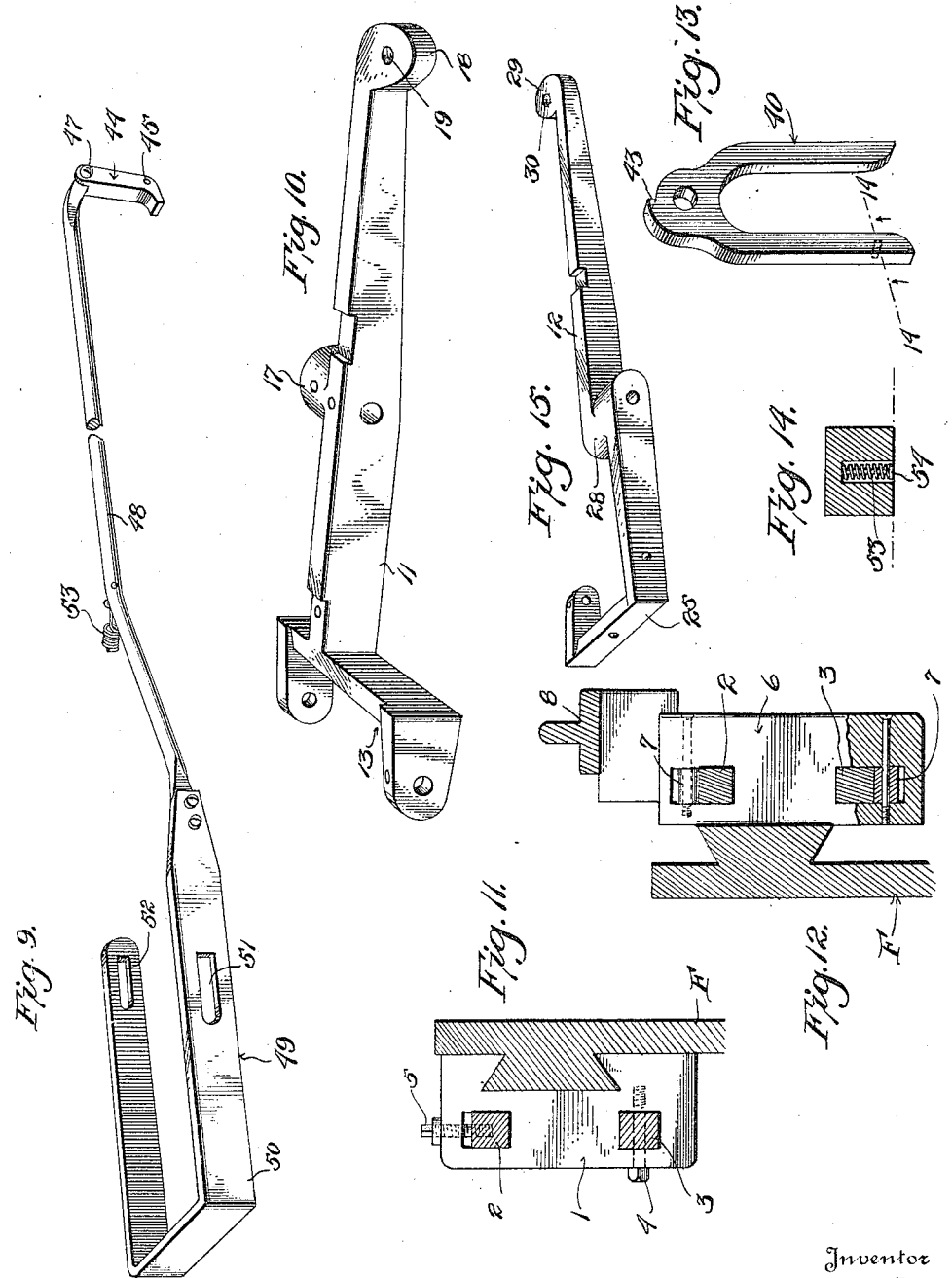

UNITED STATES PATENT OFFICE.

JOHN E. NORQUEST, OF RICHMOND, VIRGINIA, ASSIGNOR TO P. LORILLARD COMPANY, OF NEW YORK, N. Y., A CORPORATION OF NEW JERSEY.

SAFETY CUTTING MECHANISM.

1,252,932. Specification of Letters Patent. Patented Jan. 8, 1918.

Application filed July 23, 1917. Serial No. 182,283.

*To all whom it may concern:*

Be it known that I, JOHN E. NORQUEST, a citizen of the United States, and residing at Richmond, in the county of Henrico and State of Virginia, have invented new and useful Improvements in Safety Cutting Mechanism, of which the following is a specification.

The present invention relates to a safety cutting mechanism, adapted particularly for use in conjunction with a machine for making cigars, cheroots and kindred manufactured products.

For the purpose of presenting a clear understanding of the invention, I have herein shown and described it operating to cut cigar and cheroot wrappers from tobacco leaves placed upon the suction bed, constituting a part of a well-known type of cigar-making machine, but wish it to be understood that the invention is not limited in its application to the cutting of tobacco leaves, as it may be employed for cutting other leaves or sheet-like articles, or may be used for other purposes as may be deemed advantageous and desirable.

In the present instance I propose to provide a cutting mechanism embodying a plurality of independently mounted, freely revoluble cutter rolls adapted to be reciprocated on and to coöperate with a properly-shaped cutting die located at the leaf holding suction bed of the machine, the coaction of the rolls and die causing a leaf on the bed to be sharply and cleanly cut or trimmed, thereby obviating the liability of tearing or injuring the wrapper leaf, or the formation of ragged, broken edges on the latter.

Furthermore, I so arrange the cutter rolls relative to each other and incline the same at such an angle to the cutting die, that each will coact with an adjacent side or section of the die to cut the leaf on both the forward and return stroke or travel of the roll, thereby causing the complete cutting or shearing of the leaf, both of said rolls being maintained under a proper tension or pressure to insure the accomplishment of this purpose, provision being made for adjusting the tension or pressure of the rolls to conform to the particular class of work to be done, or the specific material to be operated upon.

Another object of the invention is the inclusion of means for automatically throwing the cutting mechanism out of operation in an emergency, as for instance, in case the hand of the operator should be accidentally caught between the suction bed or cutting die, and the cutter rolls. Under such condition the cutting mechanism will be instantly rendered inoperative by being automatically disconnected from driven relation with its power mechanism, but will be subsequently restored to such relationship during the same cycle of operation of the machine. In other words, I insure the stopping of the cutting mechanism in an emergency, and also provide for the subsequent restarting of the machine without the necessity of manipulating or controlling the source of its power such as the drive belt or power shaft.

In this connection I also provide for manually throwing the cutting mechanism out of operation at predetermined times as under conditions hereinafter recited.

It is also my purpose to provide a safety cutting mechanism which will embrace the desired features of rapidity, simplicity, efficiency, and durability, and which may be operated continuously and for long periods of time without necessitating repair either to itself or to the coöperating elements of the machine.

With the above-recited objects and others of a similar nature in view, my invention consists in the construction, combination and arrangement of parts set forth in and falling within the scope of the appended claims.

In the accompanying drawings:

Figure 1 is a top plan view of the cutting mechanism embodying my invention, the same being shown in connection with such adjacent parts of a well-known type of cigar or cheroot making machine as are sufficient to give a clear understanding of the operation and arrangement of my mechanism.

Fig. 2 is a view in side elevation.

Fig. 3 is a detail view partly in cross section and partly in elevation, showing the cutter rolls coöperating with the cutting die to trim a leaf.

Fig. 4 is a longitudinal sectional view taken on the line 4—4 of Fig. 1.

Fig. 5 is a cross sectional view taken on the line 5—5 of Fig. 1.

Fig. 6 is a cross sectional view taken on the line 6—6 of Fig. 1.

Fig. 7 is a sectional view taken on the line 7—7 of Fig. 6.

Fig. 8 is a detail sectional view on the line 8—8 of Fig. 2.

Fig. 9 is a perspective view of the cutter roll fender.

Fig. 10 is a similar view of one of the cutter roll carrying arms.

Fig. 11 is a sectional view on the line 11—11 of Fig. 2.

Fig. 12 is a sectional view on the line 12—12 of Fig. 2.

Fig. 13 is a perspective view of the safety clutch yoke.

Fig. 14 is a detail sectional view of such yoke, on line 14—14 of Fig. 13.

Fig. 15 is a perspective view of the roll-carrying arm which is a companion of that shown in Fig. 10.

Referring now to the accompanying drawings in detail, the letter A indicates the usual suction bed as an entirety, and B is the cutting die thereof. As these elements are of well-known form they need not be described further, except to say that the tobacco leaf shown at C which is to be cut to provide a cigar or cheroot wrapper is held on the suction bed above and in contact with the cutting die through suction exerted through the pipe D.

My improved safety cutting mechanism which co-acts with this die B to cut or trim the leaf, is indicated as a whole by the letter E, and is constructed and functions as follows:

Fastened to the bed F of the machine are the two end blocks or castings 1—1, forming bearings for the two tracks 2—3, the lower track 3 being permanently held in place in any suitable manner, such as by bolts 4, while the upper track 2 is adjustably secured in the bearing blocks by means of set screws 5, so that the distance between the two tracks may be varied to compensate for wear or other reasons. Sliding on the tracks 2 and 3 is a traveling carriage block 6 carrying anti-friction rollers 7 which bear against the tracks as best shown in Fig. 12, the purpose of these rollers 7 of course being to reduce the friction incident to the travel of the carriage on the tracks. This carriage block 6 has bolted to the top thereof one end of an arm 8, which is adapted to carry the mountings of the cutter rolls as hereinafter mentioned. At the forward or free end of the arm 8 is a head 9 in which are socketed the inner ends of the stud shafts 10, which are arranged diametrically or in off-set relation to each other as shown in Fig. 1. These shafts 10 have mounted thereon the roll-carrying arms 11 and 12. As shown in Fig. 10, the arm 11 is formed at its forward end with a bifurcation 13, carrying the shaft 14 on which is loosely mounted the cutter roll 15, suitable anti-friction bearings 16, being provided for the latter, and as will be evident, the roll thus mounted, may revolve freely in both directions. Intermediate its ends this arm 11 is formed with a sleeve 17 for the adjacent stud shaft 10, which constitutes a pivot for this arm. The rear end of the arm 11 is formed with a bored enlargement 18, in the bore 19 of which is threaded the screw shank 20. A spring 21 is coiled about this shank and bears at its upper end against the enlargement of the arm and at its lower end against the arm 8, the purpose of this spring being of course to tension the arm 11 and normally force the roll 15 down into leaf-cutting relation with the cutter die. Mounted on the bifurcation of the arm at the rear of and in contact with the cutter roll 15, is a wiper 22, the purpose of which is to free the roll from any particles of tobacco which may adhere thereto during the cutting operation. In action the roll 15 is intended to coöperate with the side $b$ of the cutting die.

The other cutter roll 15' which is companion to the roll 15 but mounted forwardly and independently thereof and in staggered relation thereto, is mounted on the roll-carrying arm 12 shown in detail in Fig. 15. This arm 12, has at its forward end a head 25, constituting a support for the shaft 26, of the roll 15' which is loosely mounted thereon, anti-friction bearings 27 being provided to insure the free revolution of the roll in either direction, around its shaft. The intermediate section of the arm 12 is formed with a sleeve bearing 28 by which the arm is pivotally mounted on the adjacent stud shaft 10, and the rear section of the arm 12 which is offset relative to the forward section thereof, terminates in an enlargement 29 having the threaded bore 30 in which is threaded the screw shank 31, around which is coiled the tension spring 32 which, bearing against the enlargement 29, forces the forward end of the arm 12 downward, thus tending to maintain the cutter roll in cutting relation with the side or section $b'$ of the cutter die B. A wiper 33, similar to the wiper 22, is carried by the head 25, forward of the roll 15' and is intended to wipe such roll as will be readily understood. It will be noted that the rolls 15 and 15' are arranged tandem and in staggered relation and that the shaft of the rolls are inclined in opposite relation to each other, so that each roll is inclined to the proper degree, relative to its coöperating beveled cutting die side or section as shown in Fig. 3, to insure that the leaf will be cleanly cut or sheared on both the forward and backward travel of the rolls without the necessity of imparting a lateral rocking motion to the reciprocating arm 8. On the contrary, the latter moves in a longitudinal path without the rocking action usually necessary in the reciprocating arms of machines of this class, and thus the action of the cutting mechanism is simplified, while at the same time, the cut made will be clean and sharp, thus avoiding bruising or tearing the edges of the wrapper which is a matter of frequent occurrence with the ordinary cutter mechanism.

For the purpose of regulating the tension exerted on each roll-carrying arm by its spring at the rear end of such arm, I make use of the arrangement best shown in Figs. 6 and 7, where each arm is shown as embraced by an angular clip 34 which is adjustably secured at its foot to the reciprocating arm 8, by means of a pair of screws 35, a third screw 36 being threaded through the foot of the clip and bears against the arm as clearly shown in Fig. 7. By loosening or tightening the screws the binding action of the head of the clip on the adjacent cutter roll arm may be regulated, and consequently the pressure or tension exerted on the cutter roll by the spring of the cutter roll arm controlled and regulated and to the minutest degree. Of course other means might be employed for regulating the tension of the cutter rolls.

The carriage block 6, carrying the arm 8, is preferably reciprocated as follows: A cam lever 37 suitably driven from power transmission mechanism, constituting a well-known part of the machine, imparts a swinging motion to the rocking lever arm 38. At its free end the latter carries a roller 39 making a loose connection with the link-yoke 40, one arm of which normally bears against the stop 41 on the carriage block 6, the yoke being pivoted at 42 to such block. Such stop 41 limits the outward swinging movement of the yoke. The upper end of the latter is formed with a shoulder 43 with which engages the latch 44 pivoted at 45 to the plate 46 of the carriage. The upper end of the latch is pivotally connected at 47 with the rear end of the rod 48 of the safety fender 49, as shown in Fig. 9. The forward end of this fender is in the form of a U-shaped member 50, which embraces the cutter rolls as shown in Fig. 1, and is provided at its side sections with elongated slots 51 and 52 in staggered relation to loosely receive the outer ends of the stud shafts 10—10 forming the pivots of the cutter roll arms as hereinbefore mentioned. Thus the fender may be bodily shifted a short distance relative to the cutter rolls longitudinally through this slot and stud arrangement, especially when the forward section of the fender is forcibly pushed rearward, should the operator's hand be caught between the fender and suction bed. A spring 53 connected at one end to the arm 8, and at its other end to the rod section 48 of the fender acts to normally pull the fender forward and this pulling forward on the upper end of the latch 44, will hold the lower end or toe of the latter in position of engagement with the shoulder 43 of the yoke 40 as shown in Fig. 2. Thus, under normal working conditions, the yoke will be held in vertical position by the latch engaging the shoulder of the yoke and by the stop 41 at the bottom of the yoke. Consequently, the lever arm 38 pushing against the yoke thus vertically held will shift the carriage back and forth to cause the cutting operation, that is, so long as the fender is held thrust forward by the spring 53. But should the operator for instance, catch a hand between the fender and bed, or beneath the fender and end of the bed, as might occur in feeding the leaf, the obstruction thus created, will force the fender rearward against the action of the spring 53, thus causing the toe of the latch to move up over the shoulder 43 of the yoke and causing the release of the upper end of the latter. The result is that the lever arm 38 will swing the yoke on its pivot 42, and the roller at the end of the lever arm will pass out through the open end of the yoke. Consequently, the lever arm 38, being disconnected from the carriage block, the latter will be brought to a stop, thereby preventing further travel of the cutter rolls and avoiding the crushing or cutting of the operator's hand. By causing the yoke 40 to be shifted by the lever arm 38 to make the disconnection just described, it will be noted that it is unnecessary to throw the whole machine or any part of the power transmission thereof out of operation, and consequently no time is lost in throwing belt clutch or other controlling devices. Furthermore, in order that no time may be lost in reëstablishing the driving relationship or connection between the carriage block and its operating lever arm 38, I insure that after an automatic disconnection of this lever arm 38 has been made as just described, the yoke 40 will be brought to a position where its open end will receive the roller at the end of the lever arm on the rearward or return movement of the latter after such disconnection. This I accomplish by providing a spring tensioned pin 54 which is socketed in one of the arms of the yoke, and projects slightly outward beyond the inner face of this arm so as to frictionally engage the adjacent face or wall of the carriage block 6. Thus when the yoke is swung upward alongside the wall of the carriage, or when the disconnection is being made, the pin will bear against such wall under sufficient tension to maintain the yoke stationary in whatever position it happens to be when the end of the lever arm 38 pulls through the open end of the yoke in the forward travel of such lever arm. Consequently, on the return or rearward stroke of this lever arm the roller at the end of the latter will ride into the open mouth or end of the yoke, which has been held in receptive position for such purpose by the spring tensioned pin 54. An operating connection is thus reestablished between the lever arm and yoke and the latter will be pulled back to vertical position shown in Fig. 2, by the continued return movement of the lever arm, and, the obstruction having been removed from between the suction bed and fender, the spring 53 will again act and restore the latch 44 to interlocking engagement with the yoke so that the normal operation of the machine is automatically resumed.

Under some conditions, as in inspecting the machine, in starting the feed and for other reasons, it may be desirable to throw the cutter mechanism out of operation without disconnecting or affecting the power transmission device, it being advantageous to do this and thus prevent the dulling of the die edges by the idle contact of the rollers therewith. I accomplish this disconnection manually by means of an eccentric stud 55 threaded or socketed in the plate 46, it being only necessary to turn this stud so that the toe of the eccentric will contact with the latch and hold the latter out of engagement with the shoulder of the yoke. To restore the connection, the eccentric stud is again turned to release the pressure against the latch and permit the latter to move into engagement with the yoke shoulder.

From the above description, taken in connection with the accompanying drawings it will be seen that I have provided a cutting mechanism which will operate to rapidly and continuously cut the leaves with a sharp, clean, shearing cut, yet will be automatically and instantly released in an emergency, thus conducing to the safety of the operator by preventing injury, yet after such disconnection, the parts will be brought back to operate in relationship without loss of time.

While I have herein shown and described one preferred embodiment of my invention, I wish it to be understood that I do not limit myself to all the precise details herein set forth by way of illustration, as modifications and variations may be made without departing from the spirit of the invention or exceeding the scope of the appended claims.

What I claim is:—

1. In a safety cutting mechanism for cigar and cheroot machines, the combination with a cutting die, of a horizontally reciprocating cutter roll mechanism traveling to and fro in a rectilinear path across the die, power mechanism for the cutter roll mechanism, a safety clutch connection between the power mechanism and the cutter roll mechanism and a horizontally disposed shiftable guard traveling with and embracing the cutter roll mechanism and adapted to be operated under pressure to actuate the safety clutch connection and disconnect the power mechanism from the traveling cutter roll mechanism.

2. In a safety cutting mechanism for cigar and cheroot machines, the combination with a cutting die, of a horizontally reciprocating carriage, a horizontally disposed arm carried thereby, cutter roll mechanism carried by said arm and adapted to travel to and fro in a rectilinear path across the die, power mechanism for reciprocating the carriage, a safety clutch connection between the power mechanism and the carriage, and a shiftable guard traveling with and embracing the cutter roll mechanism and adapted to be operated under pressure to actuate the safety clutch connection and disconnect the power mechanism from the carriage.

3. In a safety cutting mechanism for cigar and cheroot machines, the combination with a cutting die, of a horizontally reciprocating carriage, a horizontally disposed arm carried thereby, a plurality of cutter rolls pivotally connected with said arms and adapted to travel to and fro in a rectilinear path across the die, power mechanism for reciprocating the carriage, a safety clutch connection between the power mechanism and the carriage, and a horizontally disposed, spring tensioned shiftable guard traveling with and embracing the cutter rolls and adapted to be operated under pressure to actuate the safety clutch connection and disconnect the power mechanism from the carriage.

4. In a safety cutting mechanism for cigar and cheroot machines, the combination with a cutting die, of a horizontally reciprocating carriage, cutter roll mechanism mounted on the carriage and traveling to and fro across the die, power mechanism for reciprocating the carriage, a safety clutch comprising a pivoted yoke and a latching device therefor constituting a connection between the power mechanism and the carriage, and a shiftable guard traveling with and embracing the cutter roll mechanism and adapted to be operated under pressure to actuate the safety clutch and disconnect the power mechanism from the carriage.

5. In a safety cutting mechanism for cigar and cheroot machines, the combination with a cutting die, of a horizontally reciprocating carriage, a horizontally disposed arm mounted on the carriage, a plurality of pivoted spring tensioned cutter rolls supported from said arm and adapted to travel to and fro across the die with the reciprocation of the carriage, power mechanism including a swinging lever arm for reciprocating the carriage, a safety clutch comprising a pivoted yoke and a latching device constituting a connection between the lever arm and the carriage, and a shiftable guard connected with the latching device of the safety clutch and embracing the cutter rolls and adapted to be operated under pressure to actuate such safety clutch and disconnect the power mechanism from the carriage.

6. In a safety cutting mechanism for cigar and cheroot machines, the combination with a cutting die, of a horizontally reciprocating carriage, cutter roll mechanism mounted on the carriage and traveling to and fro across the die, power mechanism for reciprocating the carriage, a safety clutch comprising a pivoted yoke and a latching device therefor constituting a connection between the power mechanism and the carriage, and means operable to release the latching device and permit the swinging of the pivoted yoke, such actuation of the clutch causing the disconnection of the power mechanism from the carriage.

7. In a safety cutting mechanism, the combination with a cutting die, of a traveling cutter roll mechanism coöperating therewith, power mechanism for the traveling cutter roll mechanism, a safety clutch connection between the power mechanism and the traveling cutter roll mechanism, and a shiftable guard for the traveling cutter roll mechanism adapted to be operated under pressure to actuate the safety clutch and disconnect the power mechanism from the traveling cutter roll mechanism, and means for restoring the safety clutch to position to again connect the power mechanism with the traveling cutter roll mechanism.

In testimony whereof I have hereunto set my hand.

JOHN E. NORQUEST.

Copies of this patent may be obtained for five cents each, by addressing the "Commissioner of Patents, Washington, D. C."